United States Patent [19]
Picker

[11] 3,856,467
[45] Dec. 24, 1974

[54] CUMULATIVE THERMAL DETECTOR
[75] Inventor: Patrick Picker, Sherbrooke,
[73] Assignee: Universite De Sherbrooke
[22] Filed: June 5, 1972
[21] Appl. No.: 259,630

[52] U.S. Cl. ............ 23/230 R, 23/253 R, 73/190 R
[51] Int. Cl. ...................... G01k 17/02, G01n 33/00
[58] Field of Search ............. 23/230 R, 253 R, 259; 73/190 R, 204 U.S.

[56] References Cited
UNITED STATES PATENTS
3,726,644  4/1973  Desnoyers et al................. 23/230 R Primary Examiner—Joseph Scovronek
Attorney, Agent, or Firm—Fetherstonhaugh & Co.

[57]  ABSTRACT

A cumulative thermal loop applied to microcalorimetry of mixing in which a counter current heat exchanger permits the transfer of reaction heat from the mixture product back to the reactants, thus creating a cumulative effect of the reaction heat until at equilibrium the temperature variation is detected which is equal to the original temperature plus a constant times the unitary reaction heat.

The system can be duplicated to provide differentiation, and thermal feedback techniques can be applied in order to equalize the temperature of the observation cell and of the reference cell.

7 Claims, 4 Drawing Figures

PATENTED DEC 24 1974　　　　　　　　　　　　　3,856,467

3,856,467

CUMULATIVE THERMAL DETECTOR

This invention relates to flow microcalorimeters, and in particular to a cumulative thermal detector for use in microcalorimetry instrumentation used for studying thermal properties of liquids.

A flow calorimeter is described in U.S. Pat. application Ser. No. 13,433, filed Feb. 24, 1970, entitled FLOW CALORIMETER by PICKER et al., now U.S. Pat. No. 3,726,644 issued Apr. 10, 1973 in which a heat exchanger liquid is used as information carrier in a counter current heat exchanger. The present invention utilizes the principle of counter current heat exchanger but adapted in such a manner as to produce a cumulative effect of the reaction heat so as to increase the sensitivity of the apparatus.

Specifically, the liquids under study, the reactants, are circulated separately through a counter current heat exchanger in a first direction while the mixture of these liquids is circulated through the heat exchanger in the opposite direction. There being no temperature control i.e., thermostating of the liquid mixture between the mixing process and the heat exchanger, the reaction heat is continuously transferring from the mixture to the reactants until at equilibrium the heat losses in the system equal the rate of the reaction heat.

Hence, the temperature variation in the mixture is considerably increased thus facilitating its detection.

A thermal loop in accordance with this invention can also be used differentially in a manner similar to that described in the above noted patent application of PICKER et al.

The invention therefore provides a thermal detector comprising a first and second reactant duct means for circulating a first and a second reactants, each reactant duct means having an inlet end, an outlet end and a heat exchange region therebetween; a mixture duct means for circulating the product of said reactants, having an inlet end, an outlet end, and a heat exchange region therebetween, said mixture duct means also defining a reactants mixing region located between its inlet end and its heat exchange region, and the outlet ends of said reactant duct means merging into the inlet end of said mixture duct means. The heat exchange regions of said reactant duct means and mixture duct means are thermally closely associated with one another to thereby define a counter current heat exchanger wherein said reactants circulate in a first direction through said reactant duct means while said product circulates in the opposite direction through said mixture duct means. A temperature sensing device measures the temperature of the product upstream of the heat exchanger. Means is also provided for thermostating the reactants, and for thermally insulating the reactant and mixture duct means.

A preferred embodiment of the invention will now be described with reference to the accompanying drawings wherein.

Figure 1:
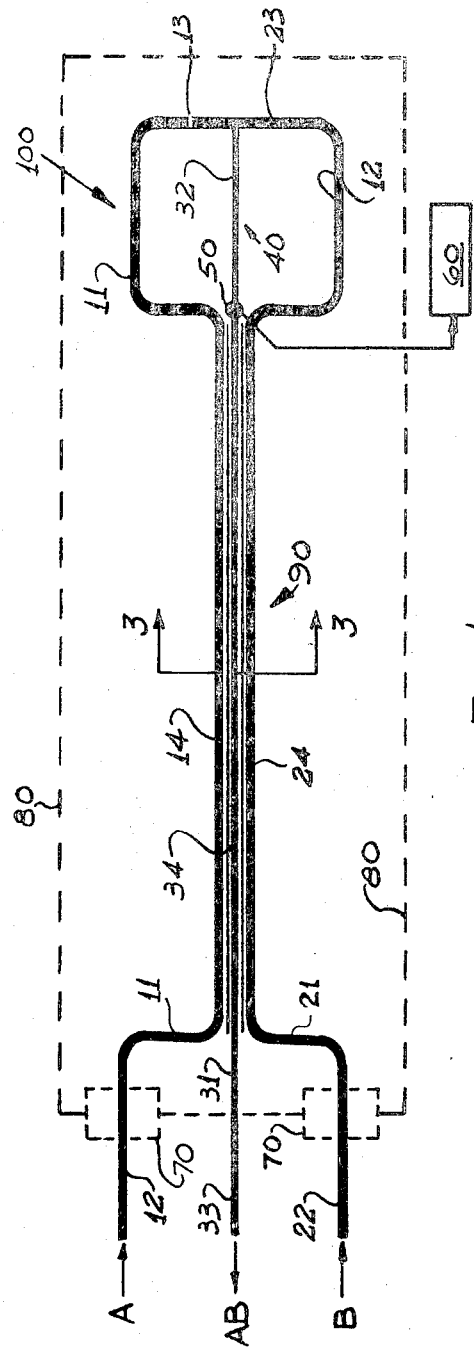
FIG. 1 is a circuit diagram of a microcalorimeter in accordance with this invention.

The illustrated detector of FIG. 1 comprises a first duct 11 for circulating reactant A, a second duct 21 for reactant B, and a mixture duct 31 for the product AB of the mixing reaction of A and B. Each duct has an inlet end 12, 22, 32, an outlet end 13, 23, 33, and a heat exchange region 14, 24, 34 intermediate the ends.

The outlet ends 13, 23 of reactant ducts 11, 21 communicate with the inlet end 32 of the mixture duct 31 where mixing of reactants A and B takes place. Space is provided between the junction of ducts 11, 21 and 31 and the heat exchanger region 34 of the mixture duct 31 so as to allow complete mixing of the reactants; the mixing chamber there constituted being identified as 40.

Figure 3:
FIG. 3 is a perspective view of a portion of the heat exchanger section of FIG. 1, taken along line 3—3 of FIG. 1 but showing an actual structure rather than a schematic view.

The heat exchange regions 14, 24 and 34 of the three ducts 11, 21, 31 are made of thin wall thermally conductive tubing, and are juxtaposed to one another in a good heat exchange relationship. In a preferred construction, as shown in FIG. 3, small stainless steel tubing are twisted together along their length and silver soldered in place as shown diagramatically at 61 in FIG. 3.

A thermistor or a thermocouple thermally connected to the mixture duct 31 upstream of the heat exchanger, such as at 50, measures the temperature of the reaction product. Element 60 can be any suitable electronic means compatible with the thermal sensor used, and capable of recording or otherwise indicating the temperature being sensed at 50 and comparing same to the thermostating temperature. For example, a thermistor can be coupled to a bridge circuit; alternatively, with a thermocouple, element 60 would comprise amplifying circuitry as is well known in the art.

FIG. 1 also shows at 70 a temperature control means used for thermostating, i.e., equalizing the temperatures of reactants A and B prior to their entering the heat exchanger regions 14, 24. Furthermore, suitable thermal insulation should be provided around the heat exchanger and the thermal loop, and this is referred to in FIG. 1 by means of line 80. In practice, insulation can be obtained by locating the critical components in an airtight container in which a high vacuum is maintained.

In practice, reactants A and B of known concentrations are circulated through ducts 11, 21 by means of analytical pumps (not shown) and thermostated upstream of the heat exchanger. At the junction of reactant ducts 11, 21 and mixture duct 31, liquids A and B mix with one another in mixing region or chamber 40, and the temperature of the mixture is affected by the reaction heat. Product AB then proceeds through the heat exchange region 34 of duct 31 where heat transfer with reactants A and B takes place. Since mixture AB and reactants A and B are flowing in opposite directions, and assuming 100 percent heat exchange efficiency and no losses, it will be seen that the reaction heat will continuously transfer to reactants A and B and accumulate in the thermal loop defined by the outlet ends 13, 23 and the mixing chamber 40. In effect therefore, the counter current heat exchanger 90 operates as a thermal insulator or coupler between the inlet ends 12, 22 and outlet end 33 on the one hand and the thermal loop 100 on the other.

However, due to heat losses along the heat exchanger 90 and the fact that the efficiency thereof is not 100 percent, a point of equilibrium is soon reached at which the rate of the heat generated by the reaction equals the losses rate. Still, the temperature measured at 50 will be equal to the sum of the initial or thermostating temperature ($T_o$) and K times the unitary temperature variation ($\Delta_m T$) wherein K is a constant of the system.

Figure 2:
FIG. 2 is a graph illustrating the temperature of the product upstream of the heat exchanger as a function of time.

In FIG. 2, the time relationship of a typical system according to FIG. 2 is illustrated by means of a graph of the temperature sensed at 50 as a function of time. At $t'$ the reaction is starting and the temperature rises rather sharply from To to $T_1$ then regeneration begins and the heat losses increase until at $T_2$ the gain equals the losses. $T_2$ which is obtained at time $t_2$ is then recorded and is equal to $t_o + K \Delta_m T$. Since $K$ and $T_o$ are known, $\Delta_m T$ can easily be obtained.

In a physical embodiment wherein stainless steel tubing 1/32 in. I.D. silver soldered were used in a vacuum housing, a constant $K$ equal to 85 has been achieved. The length of the heat exchange regions 14, 24, 34 and 9 inches and the mixing region 40 measured about 2 inches. The gain or constant K of the system varies with the flow rates of the reactants and product, being low with relatively low flow rates say 0.1 cc/minute (product) and increasing to a maximum value which was 85 at a product flow rate of 0.6 cc/minute.

Since equilibrium conditions must be reached before the measurements of the temperature can have any useful meaning, the time constant of the detection system according to the invention is relatively long, being of the order of 20 minutes; however, the increased sensitivity of this apparatus compared to the more rapid system of the above noted PICKER et al., application renders it useful for the study of thermal properties of low concentrations.

The value of constant $K$ for a given product flow rate can be determined by dividing the observed temperature variation by the calculated temperature rise using reference reactants whose thermal properties are known.

Figure 4:
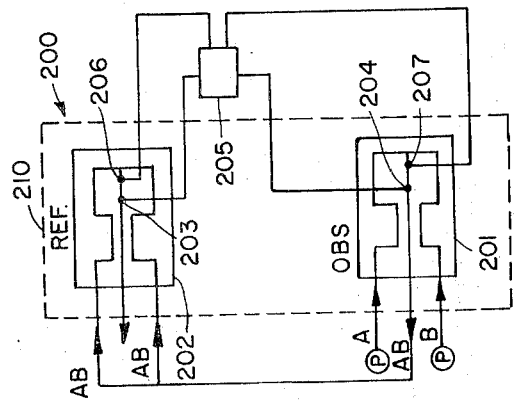
FIG. 4 is a circuit diagram of a differential microcalorimeter in accordance with the present invention.

A differential microcalorimeter 200, as shown in FIG. 4 can also be obtained when combining two identical thermal detectors as described above, one, 201, serving as "observation element," the other 202 "reference element." The two elements are placed in a thermostated shell 210 in which a high vacuum is maintained, and the output i.e., the AB product of the laboratory element 201 is applied to the two inputs of the reference element 202. All the liquids are thermostated before their admission into the inputs of the two elements.

Detection can be achieved by two heat sensors 203, 204 connected in a bridge circuit configuraton at 205; but when desired, a thermal feedback process can be used which will maintain the same temperature in both elements. To this end, germanium chip i.e., Zener diodes 206, 207 are placed on each mixture duct upstream of the heat exchanger, and heat is generated at a rate determined by the temperature gradient across the two heat sensors. With these heating elements, one can also calibrate the apparatus by generating a well-known joule effect in the observation element.

It should also be understood that, in the thermal loop system described hereinbefore, the flow rates of reactants A and B will normally be equal but, when it is necessary to operate with different reactant flow rates, care must be taken to calibrate the apparatus because the value of constant K is likely to vary as a function of the reactant flow rate ratio.

I claim:

1. A thermal detector for studying thermal properties of mixing reactants comprising first and second reactant duct means for circulating a first and a second reactant, each reactant duct means having an inlet end, an outlet end and a heat exchange region therebetween; a mixture duct means for circulating the product of said reactants having an inlet end, an outlet end, and a heat exchange region therebetween, said mixture duct means also defining a reactants mixing region located between its inlet end and its heat exchange region; and the outlet ends of said reactant duct means merging into the inlet end of said mixture duct means; the three heat exchange regions of said reactant duct means and mixture duct means being closely coupled and defining a counter-current heat exchanger wherein said reactants circulate in the first direction through said reactants duct means while said product circulates in the opposite direction through said mixture duct means; thermal insulation means for insulating said reactant and mixture duct means from the environment, temperature sensing means for detecting the temperature of said product, and thermostating means for controlling the temperature of said reactants at the inlet ends of said first and second reactant duct means.

2. The thermal detector as defined in claim 1 wherein said reactant duct means and said mixture duct means consist of thin walled small internal diameter tubing, said tubing being of stainless steel at least at the heat exchanger regions of said duct means.

3. A thermal detector as defined in claim 2 wherein the heat exchange regions of said reactant and mixture duct means made of stainless steel tubing are twisted together longitudinally and silver soldered together.

4. A microcalorimeter for studying thermal properties of mixing liquids comprising first and second reactant tubes for circulating a first and a second reactant respectively, each reactant tube having an input end, a discharge end and a heat exchange region therebetween; a common return tube connected with the discharge end of said reactant tubes, defining a mixing chamber immediately downstream of the said discharge ends of said reactant tubes, and having a heat exchange region, the three heat exchange regions of said reactant tubes and of said return tube being closely coupled and defining a counter-current heat exchanger through which said reactants circulate in a first direction towards said mixing chamber while the mixing product of said reactants circulates through said counter-current heat exchanger in the opposite direction downstream from said mixing chamber; said microcalorimeter also comprising heat sensing means for detecting the temperature of said mixture product in said mixing region; housing means surrounding said counter-flow heat exchanger and said mixing region as well as the discharge ends of said reactant tubes, means for evacuating said housing means and for maintaining same under high vacuum; said microcalorimeter also including temperature control means for thermostating said reactants upstream of said heat exchange region thereof.

5. A differential microcalorimeter comprising an observation cell and a reference cell, each cell consisting of a thermal detector which comprises first and second reactant duct means for circulating a first and a second reactant, each reactant duct means having an inlet end, an outlet end and a heat exchange region therebetween; a mixture duct means for circulating the product of said reactants having an inlet end, an outlet end, and a heat exchange region therebetween, said mixture duct means also defining a reactants mixing region located between its inlet end and its heat exchange region; and the outlet ends of said reactant duct means merging into the inlet end of said mixture duct means; the three heat exchange regions of said reactant duct means and mixture duct means being closely coupled and defining a counter-current heat exchanger wherein said reactants circulate in the first direction through said reactants duct means while said product circulates in the opposite direction through said mixture duct means; said microcalorimeter also comprising housing means for maintaining said cells under high vacuum for thermally insulating same from the environment; temperature control means for thermostating said reactant duct means of both cells upstream of said heat exchange region thereof; means for connecting the outlet end of said mixture duct means of said observation cell to said inlet ends of said reactant duct means of said reference cell; pumping means for circulating said reactants through said observation cell; first and second sensing means for detecting the temperatures of the products in the mixing regions of the mixing duct means of said observation and reference cells respectively; first circuit means for differentially interconnecting said heat sensing means and for determining the temperature gradient sensed by said first and second heat sensing means.

6. A differential microcalorimeter as defined in claim 5 additionally comprising heat generating means for heating the products in the mixing region of said observation and reference cells, second circuit means connected to said heat generating means and coupled to said first circuit means for defining a thermal feedback arrangement equalizing the temperature sensed by said first and second heat sensing means.

7. A method of studying thermal properties of the mixing product of two reactants comprising in sequence separately circulating a first and a second reactant in a first direction in the first and second tubes of a three tube counter-current heat exchanger, mixing said first and second reactants in a mixing chamber, detecting the temperature of the misture of said reactants in said mixing chamber, circulating said mixture through the third tube of said counter-current heat exchanger in the opposite direction and detecting the temperature at equilibrium.

* * * * *

UNITED STATES PATENT OFFICE
CERTIFICATE OF CORRECTION

PATENT NO. : 3,856,467
DATED : December 24, 1974
INVENTOR(S) : Picker, Patrick

It is certified that error appears in the above-identified patent and that said Letters Patent are hereby corrected as shown below:

[30] Foreign application priority data

June 1, 1972 Canada --- Serial No. 143,667

Signed and sealed this 17th day of June 1975.

(SEAL)
Attest:

RUTH C. MASON
Attesting Officer

C. MARSHALL DANN
Commissioner of Patents
and Trademarks